United States Patent
Nishikori et al.

(10) Patent No.: US 10,069,582 B2
(45) Date of Patent: Sep. 4, 2018

(54) PARAMETER SETTING APPARATUS AND METHOD

(71) Applicant: Yamaha Corporation, Hamamatsu-shi, Shizuoka-ken (JP)

(72) Inventors: Taku Nishikori, Hamamatsu (JP); Chris Angell, Rellingen (DE); Chris Taylor, Buena Park, CA (US); Hiroaki Fujita, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 0 days.

(21) Appl. No.: 14/941,426

(22) Filed: Nov. 13, 2015

(65) Prior Publication Data

US 2016/0142164 A1  May 19, 2016

(30) Foreign Application Priority Data

Nov. 14, 2014  (JP) .................. 2014-231919

(51) Int. Cl.
| | |
|---|---|
| *H04B 1/00* | (2006.01) |
| *H04H 60/04* | (2008.01) |
| *G11B 27/034* | (2006.01) |
| *G06F 3/16* | (2006.01) |

(52) U.S. Cl.
CPC ............ *H04H 60/04* (2013.01); *G06F 3/165* (2013.01); *G11B 27/034* (2013.01)

(58) Field of Classification Search
CPC ..... H04H 60/04; G06F 3/165; G11B 27/0304; G11B 27/031; G11B 27/00; G11B 27/02; G11B 27/028; G11B 27/038; G11B 27/32

USPC .......................................................... 381/119
See application file for complete search history.

(56) References Cited

U.S. PATENT DOCUMENTS

2002/0156547 A1* 10/2002 Suyama ................ H04H 60/04
 700/94
2003/0233158 A1  12/2003 Aiso et al.

FOREIGN PATENT DOCUMENTS

| EP | 1 343 094 A2 | 9/2003 |
| EP | 1 569 371 A2 | 8/2005 |
| EP | 1 971 054 A2 | 9/2008 |
| JP | H-09-83273 A | 3/1997 |

OTHER PUBLICATIONS

Extended European Search Report dated May 2, 2016, for EP Application No. 15194453.5, nine pages.

(Continued)

*Primary Examiner* — Matthew Eason
*Assistant Examiner* — Sabrina Diaz
(74) *Attorney, Agent, or Firm* — Morrison & Foerster LLP (57) ABSTRACT

A memory of a parameter setting apparatus stores therein a current value of a signal processing parameter and an auxiliary value for temporarily adjusting the current value. Once an instruction for changing the current value of the parameter is given by an operation, by a user, of a manual operator when an edit mode is ON, a CPU of the parameter setting apparatus not only changes the current value but also changes the auxiliary value in response to the current value change instruction. When the edit mode is OFF, on the other hand, the CPU changes only the current value in response to the current value change instruction without changing the auxiliary value.

10 Claims, 6 Drawing Sheets

(56) References Cited

OTHER PUBLICATIONS

Yamaha. (2004). "PM5D/PM5D-RH V2, DSP5D, Owner's Manual," PM5D Digital Mixing Console, DSP5D, Digital Mixing System, 410 pages, submit in two parts.

* cited by examiner

| | ch1 | ch2 | ch3 | ch4 | · · · |
|---|---|---|---|---|---|
| CURRENT VALUE (AUXILIARY VALUE) | a (b) | a (b) | a (b) | a (b) | |
| CURRENT VALUE AT START OF OVERLAY MODE | a+b | a+b | a+b | a+b | |
| FIRST FADER OPERATION | +c | | +d | | |
| CURRENT VALUE AFTER THE FADER OPERATION | a+b+c | a+b | a+b+d | a+b | |
| EDIT MODE ON | | | | | |
| SECOND FADER OPERATION | | +c | | +d | |
| (AUXILIARY VALUES) CURRENT VALUE AFTER THE FADER OPERATION | (b) a+b+c | (b+c) a+b+c | (b) a+b+d | (b+d) a+b+d | |
| EDIT MODE OFF | | | | | |
| CURRENT VALUE AFTER END OF THE OVERLAY MODE | a+c | a | a+d | a | |

| OVERLAY SETTING | | | | | | | | CLEAR ALL | ✕ |
|---|---|---|---|---|---|---|---|---|---|
| ON | CH3 8Letters MATRIX SEND1 −72.00 | CLEAR | FADER | MIX SEND | MATRIX SEND 1 LEVEL | MATRIX SEND 2 LEVEL | MATRIX SEND 3 LEVEL | MATRIX SEND 4 LEVEL | |
| CH1 | ch name | | | | | | | | |
| CH2 | wwwww | | +72.00 | | | | | | |
| CH3 | 8Letters | | | ... | −72.00 | +72.00 | | | |
| CH4 | 8Letters | | | | | | | −72.00 | |
| CH5 | 8Letters | | −72.00 | | −72.00 | | | | |
| CH6 | 8Letters | | | | | | +72.00 | | |
| CH7 | 0 | | | | | | | | |
| CH8 | 0 | | | ... | | | | | |

PARAMETER SETTING APPARATUS AND METHOD

BACKGROUND

The present invention relates to parameter setting apparatus and methods for setting a value of a parameter that defines behavior of signal processing, and more particularly to a parameter setting apparatus and method provided with a function for temporarily adjusting a current value of such a parameter by use of an auxiliary value.

In the field of digital mixing consoles (hereinafter also referred to as "mixers") which perform signal processing on audio signals of a plurality of channels mainly through digital processing, a "scene function" has heretofore been known which stores in advance a plurality of "scene data" each comprising a set of values of a plurality of parameters that define behavior of the signal processing and then reads out any one of the plurality of scene data to collectively set the read-out scene data as current values of the parameters. In a situation where the scene function is actually used, there may sometimes occur a need for temporarily adjusting the values of the parameters included in the scene data in accordance with various conditions, such as an environment of a venue, conditions of musicians (players) and positional variation of microphones, and then setting the thus-adjusted values as current values of the parameters. As one example of the scene function, it has been known to add offset values to the current values and set the added results as new current values (see, for example, Japanese Patent Application Laid-open Publication No. HEI-09-83273 (hereinafter referred to as "Patent Literature 1").

Patent Literature 1 discloses an apparatus that includes: an input/display device (reference numeral 7 in Patent Literature 1) for operating values of parameters included in read-out scene data; an input/display device (reference numeral 8 in Patent Literature 1) for operating offset values; and an input/display device (reference numeral 11 in Patent Literature 1) for operating current values having the offset values added thereto. When the current values have been changed by the input/display device (reference numeral 11 in Patent Literature 1) that operates the current values having the offset values added thereto, differences between the thus-changed current values and the values of the parameters included in read-out scene data are recorded as new offset values. With such arrangements, however, it is necessary to properly use the plurality of input/display devices for desired purposes, and values changing operations would require much time and labor. In the case where the current value adjusting function using the offset values is employed, there are many factors which a human operator should take into consideration, such as which of the offset values, current values having the offset values added thereto (i.e., current values after the offset value addition) and current values not yet having the offset values added thereto (i.e., current values before the offset value addition) would become an object of change responsive to a value change instruction. Thus, if operations of the input/display devices are complicated, much confusion would be caused to the user or human operator.

Further, in an instruction manual for "YAMAHA DIGITAL MIXING CONSOLE PM5D/PM5DRH" by Yamaha Corporation available from the Internet at http://www2.yamaha.co.jp/manual/pdf/pa/japan/mixers/PM5DJ1.pdf (hereinafter referred to as "Non-patent Literature 1"), an offset value setting method where a setting screen is displayed on a display and an offset value is set on the displayed setting screen. In this case, a screen switching operation has to be performed several times before the desired setting screen is displayed, which tends to require much time and labor. Further, because the setting screen is configured so that a numerical value of an offset value is input directly, it is difficult for a user or human operator to intuitively see what a result of an offset value, set on the screen, being added to a current value will be like.

SUMMARY OF THE INVENTION

In view of the foregoing prior art problems, it is an object of the present invention to provide a parameter setting apparatus and method which allow an auxiliary value for temporarily adjusting a current value of a signal processing parameter to be changed easily without requiring much time and labor.

In order to accomplish the above-mentioned object, the present invention provides an improved parameter setting apparatus, which comprises: a storage section configured to store therein a current value of a signal processing parameter and an auxiliary value for temporarily adjusting the current value; a switching section configured to switch between ON and OFF states of an edit mode that define whether or not to update the auxiliary value; and a control section configured to, when the edit mode is ON and in response to a current value change instruction given by an operation of a manual operator (manual operating member), change the current value and change the auxiliary value so as to reflect the change instruction.

According to the present invention, in response to a current value change instruction given by an operation of the manual operator when the edit mode is ON, not only the current value is changed, but also the auxiliary value is changed so as to reflect the current value change instruction. Thus, when the edit mode is ON, not only the current value but also the auxiliary value can be changed in response to the current value change instruction given by the operation of the single manual operator. When the edit mode is OFF, on the other hand, only the current value is changed in response to the current value change instruction without the auxiliary value being changed. Thus, by a user or human operator merely performing a simple operation of switching between the ON and OFF states of the edit mode, the auxiliary value can be changed with the same manual operator for changing the current value. Consequently, the human operator can determine an auxiliary value fitting the present conditions with an operating feel as if he or she were changing the current value of the parameter. Further, there is no need to use different manual operators (manual operating members) for changing the current value and for changing the auxiliary value. As a result, the present invention achieves the superior advantageous benefit that the auxiliary value for temporarily adjusting the current value can be changed with utmost ease and without requiring much time and labor.

The present invention may be constructed and implemented not only as the apparatus invention discussed above but also as a method invention. Also, the present invention may be arranged and implemented as a software program for execution by a processor, such as a computer or DSP, as well as a non-transitory computer-readable storage medium storing such a software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION

Figure 1:
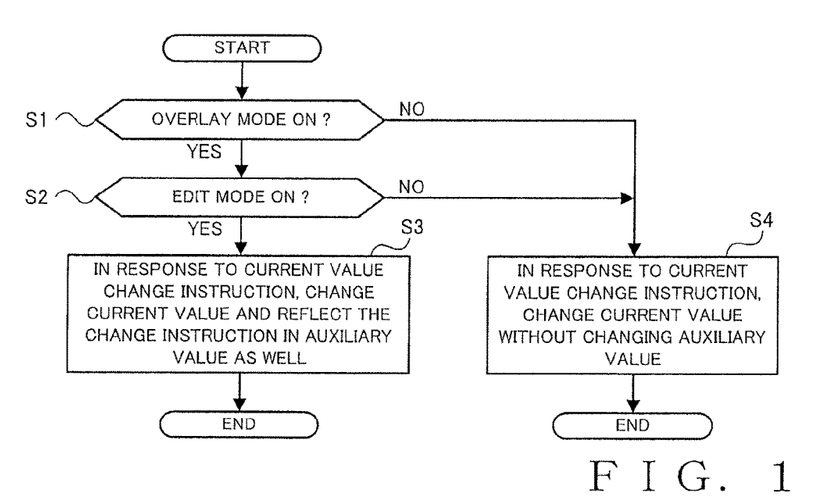
FIG. 1 is a flow chart explanatory of an example operational sequence of processing performed in a preferred embodiment of a parameter setting apparatus of the present invention in response to a value change instruction.

FIG. 1 is a flow chart explanatory of an example operational sequence of value change processing performed in a preferred embodiment of a parameter setting apparatus of the present invention. The parameter setting apparatus includes: a storage section storing therein current values of signal processing parameters and auxiliary values for temporarily adjusting the current values of the signal processing parameters; a switching section that switches between ON and OFF states of an edit mode; and a control section configured to, when the edit mode is ON and in response to a current value change instruction given through an operation of a manual operator (i.e., manual operating member), change the current value corresponding to the operated manual operator and change the corresponding auxiliary value so as to reflect the change instruction. More specifically, once a user or human operator gives an instruction for changing the current value of any one of the parameters by operating the above-mentioned manual operator, the parameter setting apparatus determines at step S1 whether a later-described "overlay mode" is ON. If the overlay mode is ON (YES determination at step S1), the parameter setting apparatus further determines at step S2 whether the edit mode is ON. If the edit mode is ON (YES determination at step S2), the parameter setting apparatus, in response to the current value change instruction given by the operation of the operator, changes the current value and changes the auxiliary value so as to reflect the change instruction, at step S3. The current value and the auxiliary value may be changed at step S3, for example, by separately changing the current value and the auxiliary value stored in the storage section, by changing the auxiliary value stored in the storage section and then reflecting the change of the auxiliary value in the current value stored in the storage section to thereby change the current value, or by changing the current value stored in the storage section and then reflecting the change of the current value in the auxiliary value to thereby change the auxiliary value. If, on the other hand, the edit mode is OFF (NO determination at step S2), the parameter setting apparatus, in response to the current value change instruction, changes only the current value without changing the auxiliary value, at step S4. A processor functions as the control section in performing the operation of step S3. ON/OFF of above-mentioned edit mode defines whether or not to update the auxiliary value, and ON/OFF of the overlay mode defines whether or not to use the auxiliary value. More specifically, when the edit mode is ON, the auxiliary value is updated. When the overlay mode is ON, the auxiliary value is used.

Figure 2:
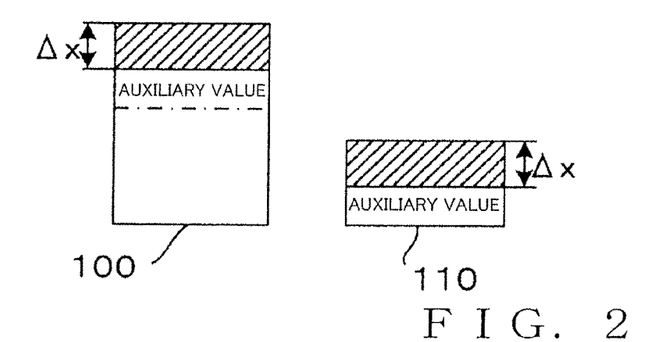
FIG. 2 is a conceptual diagram explanatory of current and auxiliary values stored in a storage section in the embodiment of the parameter setting apparatus of the present invention.

FIG. 2 is a conceptual diagram explanatory of the current and auxiliary values stored in the storage section. As shown in FIG. 2, a current value 100 and an auxiliary value 110 are stored independently of each other in the storage section per parameter. Needless to say, in the storage section, current values 100 and an auxiliary values 110 are stored independently of each other in the storage section for a necessary plurality of parameters rather than for just one parameter. While the "overlay mode" is ON, the current value 100 is maintained at a value having the auxiliary value 110 added thereto, i.e. at a value equal to a sum between the current value 100 and the auxiliary value 110. In FIG. 2, the auxiliary value 110 having been added to the current value 100 is indicated by one-dot-dash line. When the "overlay mode" has been started or activated, i.e. when the overlay mode has been switch from the OFF state to the ON state, the auxiliary value 110 is added to the current value 100 so that the current value 100 increases by the auxiliary value 110, if the auxiliary value 100 is a positive value. If, on the other hand, the current value 100 is a negative value when the "overlay mode" has been started, the auxiliary value 110 is subtracted from the current value 100 (i.e., the negative value is added to the current value 100) so that the current value 100 decreases by the auxiliary value 110. When the "overlay mode" has been ended or deactivated, i.e. when the overlay mode has been switch from the ON state to the OFF state, the current value 1 returns back to the previous value not having the auxiliary value 110 added thereto, i.e. the previous value not adjusted (i.e., unadjusted or unassisted) with the auxiliary value 110. Further, while the "edit mode" is ON, once an instruction for changing the current value by "Δx", for example, both the current value 100 and the auxiliary value 110 stored in the storage section are changed by "Δx".

Figure 3:
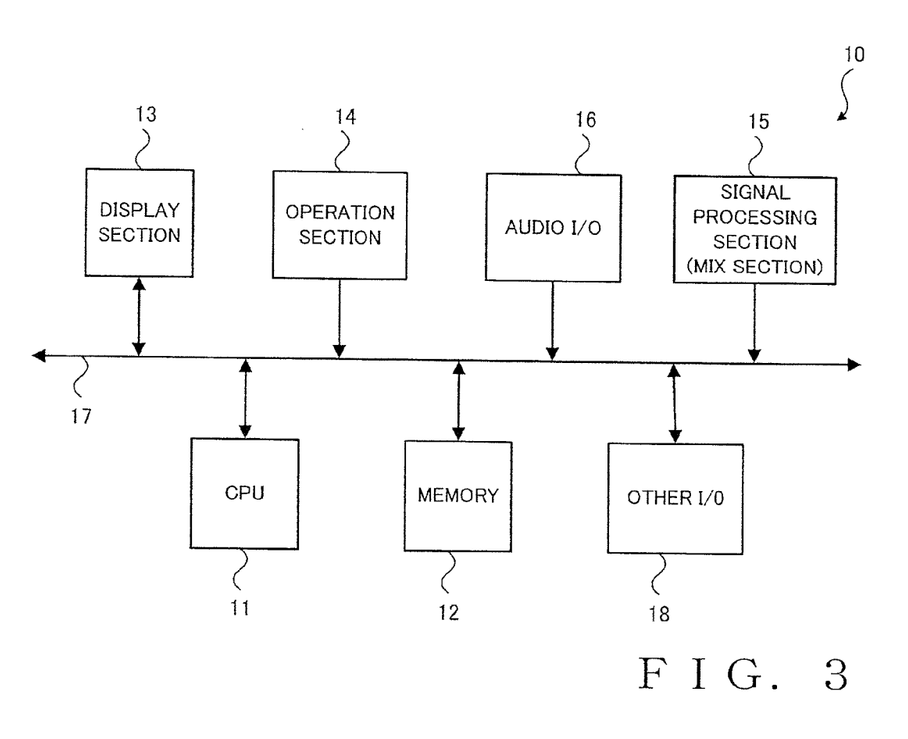
FIG. 3 is a block diagram showing an example electrical hardware setup of a mixing console to which is applied the embodiment of the parameter setting apparatus of the present invention.

Next, a description will be given about the embodiment of the parameter setting apparatus of the present invention applied to a mixing console (hereinafter referred to as "mixer") 10. FIG. 3 is a block diagram showing an example electrical hardware setup of the mixer 10 to which is applied the parameter setting apparatus of the present invention. The mixer 10 includes: a central processing unit (hereinafter referred to as "CPU") 11; a memory 12; a display section 13; an operation section 14; a signal processing section (hereinafter referred to as "MIX section") 15; and an audio interface (audio I/O) 16. The above-mentioned components 11 to 16 are interconnected via a communication bus 17, so that various control signals can be communicated between the CPU 11 and individual ones of the other components 12 to 16. The MIX section 15 can input and output analog audio signals and digital audio signals from and to input equipment, such as a microphone and a reproduction (playback) device, and output equipment, such as an amplifier and a speaker, via the audio I/O 16. Further, the mixer 10 may include another interface (other I/O) 18, such as a USB interface.

The CPU 11 controls general behavior of the mixer 10 by executing various programs stored in the memory 12. The memory 12 is used for nonvolatilely storing various programs for execution by the CPU 11 and various data but also used as a loading area for a program to be executed by the CPU 11 and as a working area. Current values (100 in FIG. 2) of a plurality of parameters defining behavior of channel-specific various signal processing and a plurality of auxiliary values (110 in FIG. 2) corresponding to the current values are stored independently of each other in the working area of the memory 12 in association with a plurality of channels provided in the mixer 10. The current values of the parameters are values being currently used in the signal processing performed by the MIX section 15. The auxiliary values are values to be temporarily added to the current values of the corresponding parameters to thereby temporarily adjust or assist the corresponding current values of the parameters. The memory 12 may be built by combining as appropriate various memory devices, such as a read-only memory, a random memory, flash memory and a hard disk. Note that examples of various types of the signal processing parameters for use in the mixer 10 include a tone volume setting parameter, a filter characteristic setting parameter and various effect setting parameters.

The display section 13, which comprises a display 34 (FIG. 5), related interface circuitry, etc., displays various information, based on display control signals given from the CPU 11, in various images, characters, etc. The operation section 14 comprises a group of manual operators (30 to 35 in FIG. 5) including fader operators provided in corresponding relation to a plurality of channel strips (i.e., channel-by-channel operation sections), related interface circuitry, etc. A user or human operator can perform operations for setting and changing the various signal processing parameters by use of the various manual operators of the operation section 14. The CPU 11 acquires a detection signal corresponding to an operation, by the human operator, of the operation section 14 and controls behavior of the mixer 10 on the basis of the acquired detection signal. The fader operators provided in the operation section 14 are each in the form of an electric fader having a knob portion whose position is automatically controlled by the CPU 11 but also manually operable by the human operator. As known in the art, when the value of a particular one of the parameters is to be set or changed, a particular one of the operators in the operation section 14 functions as an operator for setting or changing the value of the particular parameter.

The MIX section 15 is, for example, in the form of a signal processing device virtually implemented by a DSP (Digital Signal Processor) or the CPU 11 and software stored in the memory 32. By executing the signal processing program, the MIX section 15 performs signal processing on audio signals of one or more channels supplied from not-shown input equipment via the audio I/O 16 and then outputs the audio signals, having been subjected to the signal processing, to not-shown output equipment via the audio I/O 16. The signal processing performed by the MIX section 15, which includes mixing processing for mixing audio signals of a plurality of channels, is controlled on the basis of current values of a plurality of parameters stored in the memory 12. Note that the MIX section 15 is not necessarily limited to one provided within the mixer 10 and may be one externally connected to the mixer 10 via the other I/O 18.

Figure 4:
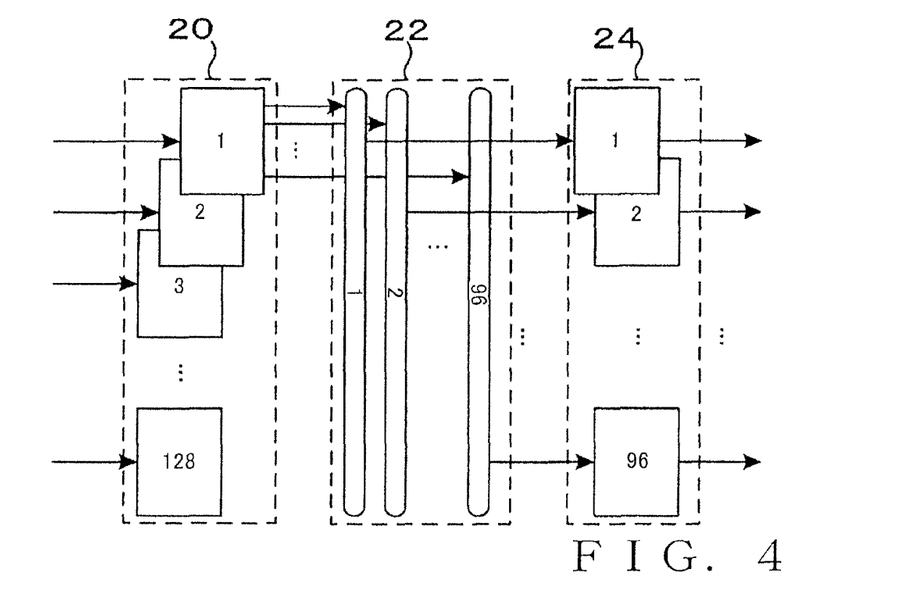
FIG. 4 is a block diagram explanatory of structural arrangements of a signal processing function in the mixing console shown in FIG. 1.

FIG. 4 is a block diagram explanatory of structural arrangements of the signal processing function of the mixer 10. Individual elements shown in FIG. 4 are caused to operate mainly through the digital signal processing performed by the MIX section 15. The mixer 10 includes an input channel section 20 having a plurality of input channels (in the illustrated example of FIG. 4, 128 input channels of channel Nos. "1" to "128"). The input channels receive audio signals from input ports (not shown) associated with the input channels, then performs signal processing on the received audio signals on the basis of values of various parameters of the input channels and then output the audio signals, having been subjected to the signal processing, to a MIX bus section 22 which, in the illustrated example of FIG. 4, has 96 buses of bus Nos. "1" to "96"; the audio signals having been subjected to the signal processing may be output to all or selected ones of the buses of the MIX bus section 22. The mixer 10 also includes an output channel section 24 having a plurality of output channels (in the illustrated example of FIG. 4, 96 input channels of channel Nos. "1" to "96") each of which is associated with any one of the buses of the MIX bus section 22. The output channels perform signal processing on audio signals output from the buses associated with the output channels on the basis of values of various parameters of the output channels. Examples of the various signal processing performed by the input and output channels include tone volume level adjustment, equalizing, panning and impartment of various effects based on current values of various parameters stored in the memory 12.

Figure 5:
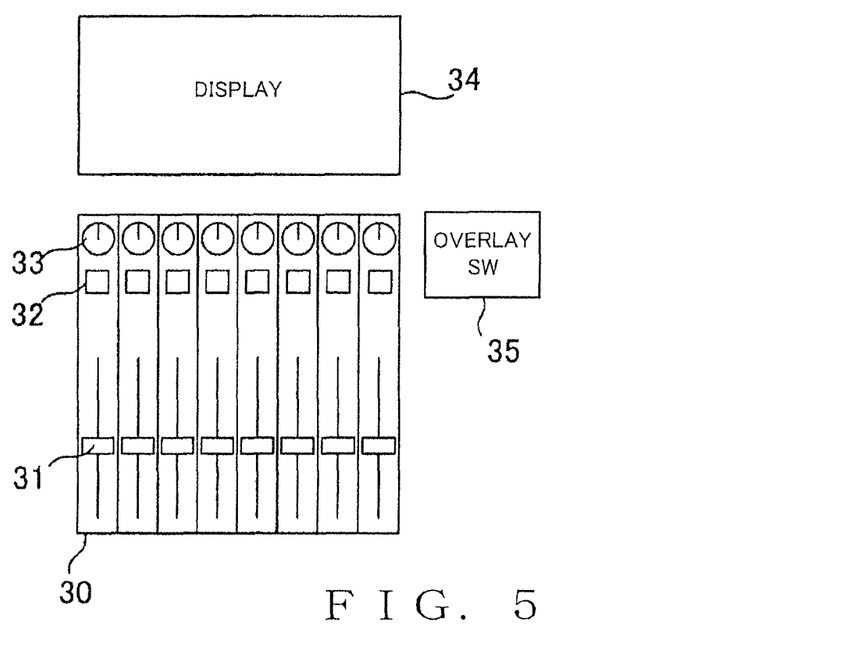
FIG. 5 is a diagram showing an example setup of an operation panel in the mixing console shown in FIG. 1.

FIG. 5 shows an example setup of an operation panel of the mixer 10. The operation panel of the mixer 10 includes a group of parameter-value hanging operators, such as the fader operators 31, button switches 32 and knob-type operators, provided in corresponding relation to the plurality of channel strips 30. Note that, in FIG. 5, reference numerals are representatively one of the channel strips 30 and operators provided in the one channel strip 30.

The plurality of channels are allocated to the channel strips 30 in a one-to-one corresponding relationship. On the basis of current values of channel-specific parameters stored in the memory 12, the CPU 11 allocates, as objects of control, the current values of the corresponding parameters to the groups of operators, such as the fader operators 31, of the individual channel strips 30. For example, current values of a tone volume level are allocated to the faders 31. A knob position of each of the fader operators 31 indicates a current value of the corresponding parameter (e.g., tone volume level).

The overlay mode switch 35 for instructing ON or OFF of the overlay mode is provided to the right of the area where the plurality of channel strips 30 is provided. The overlay mode switch 35 switches between the ON and OFF states of the overlay mode, for example, each time it is depressed once. The overlay mode is an operation mode in which the corresponding auxiliary value is added to the current value of a given parameter to thereby temporarily adjust or assist the current value of the parameter depending on the present situation or conditions.

In the instant embodiment, activation or turning-on of the edit mode is instructed by the human operator holding down the overlay mode switch 35 (i.e., keeps depressing the overlay mode switch 35 for a little while) during the overlay mode. Activation or turning-off of the edit mode is instructed by the human operator depressing the overlay mode switch 35 during the edit mode. The edit mode is an operation mode in which, in response to an operation for changing the current value of a parameter, the current value of the parameter is changed but also the auxiliary value corresponding to the current value is changed. In the instant embodiment, the overlay switch 35 and later-described operations of steps S7 of FIG. 8 and step S8 of FIG. 9 together constitute a switching section that switches between the ON and OFF states of the edit mode.

The operation panel of the mixer 10 also includes the display 34 (display section 13) comprising an LCD or LEDs, which is capable of displaying various screens under the control of the CPU 11.

Figure 6:
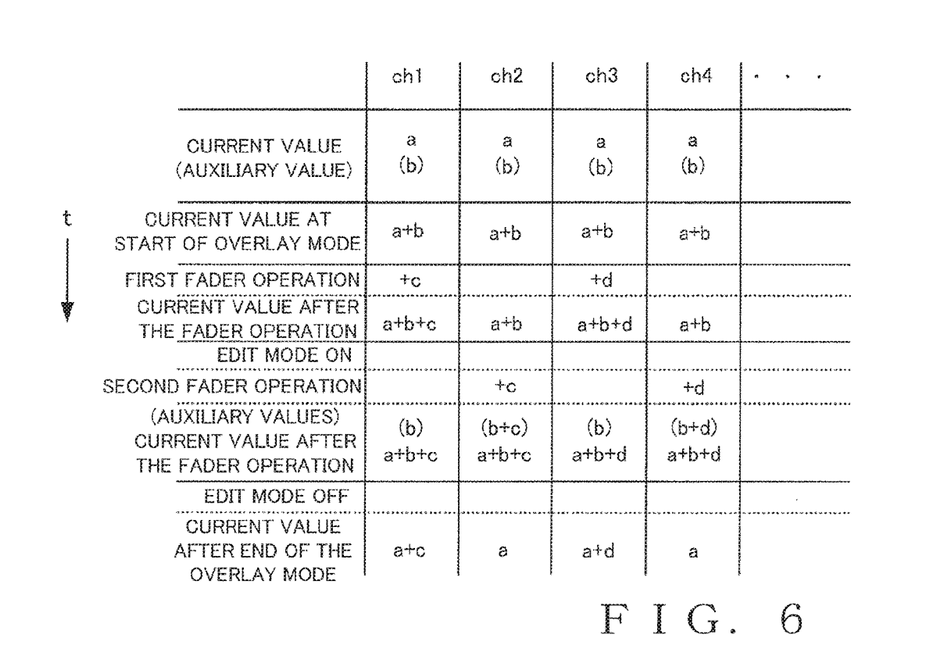
FIG. 6 is a graph showing example transitions of current values and auxiliary values responsive to operations, by a human operator, of the operation panel.

FIG. 6 is a graph showing example transitions of current values and auxiliary values responsive to operations, by the human operator, of the operation panel. The illustrated example of FIG. 6 assumes a case where values of the tone volume level allocated to the fader operators 31 are adjusted for a plurality of channels ("ch1", "ch2", "ch3", "ch4", . . . ). Current values of the tone volume level of the individual channels before the start (activation) of the overlay mode are indicated by "a", and auxiliary values corresponding to the current values of the tone volume level of the individual channels before the start of the overlay mode are indicated by "b". In FIG. 6, the vertical axis t represents passage of time. Before the start of the overlay mode, the position of the knob portion of the fader operator 31 of each of the channel strips 30 indicates the current value "a".

Figure 7:
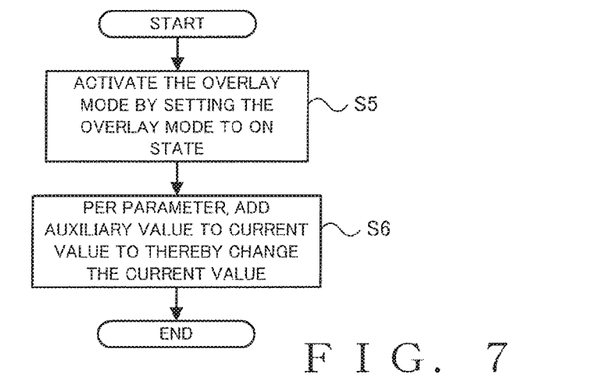
FIG. 7 is a flow chart showing an example operational sequence of a process responsive to a value changing operation.

First, once activation or turning-on of the overlay mode is instructed by the human operator depressing the overlay mode 35, the CPU 11 starts up a process shown in FIG. 7. At step S5 of FIG. 7, the CPU 11 activates the overlay mode, for example, by setting an overlay mode flag to "ON" to thereby set the overlay mode to the ON state. Then, at step S6, the CPU 11 adds the corresponding auxiliary value "b" to the current value "a" of the tone volume level of each of the channels stored in the memory 12. Thus, the current value "a" of the tone volume level of each of the channels "ch1", "ch2", "ch3", "ch4", . . . stored in the memory 12 is changed to a value "a+b"; thus, the current value "a" is placed in a state offset with the auxiliary value "b". At that time, the CPU 11 controls the position of the knob portion of the fader operator 31 of each of the channel strips 30 on the operation panel to move from the position of the value "a" over to a position of the value "a+b".

Let it be assumed here that the fader operators 31 of channels "ch1" and "ch3" are then operated by "+c" and "+d", respectively (see "First Fader Operation" in FIG. 6). In response to such operations of the fader operators, the CPU 11 starts up the processing shown in FIG. 1. Because, at that time, the overlay mode is ON (YES determination at step S1) but the edit mode is OFF (NO determination at step S2), the CPU 11 changes the current value "a+b" of the tone volume level of channel "ch1" by a value corresponding to the operated amount "+c" and changes the current value "a+b" of the tone volume level of channel "ch3" by a value corresponding to the operated amount "+d", at step S4 of FIG. 1. Consequently, the current values of the tone volume level of channels "ch1" and "ch3" are changed to "a+b+c" and "a+b+d", respectively. Namely, when the edit mode is OFF, only the current value of the tone volume level of the given channel stored in the memory 12 is changed, in response to an operation of the fader operator 31 of a given channel, without the auxiliary value of the given channel stored in the memory 12 being changed.

Figure 8:
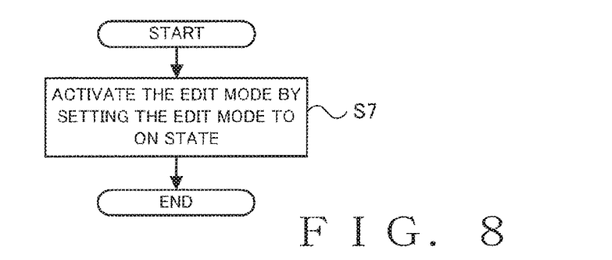
FIG. 8 is a flow chart showing an example operational sequence of a process responsive to an edit mode activating operation.
Figure 9:
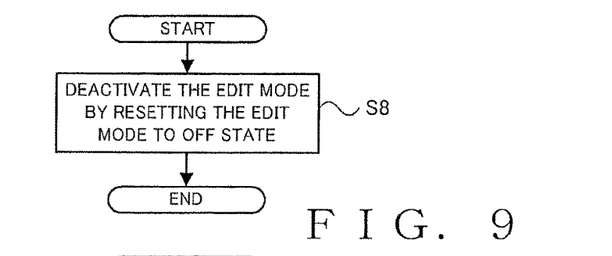
FIG. 9 is a flow chart showing an example operational sequence of a process responsive to an edit mode deactivating operation.

Then, once turning-on of the edit mode is instructed by the human operator holding down the overlay switch 35 ("Edit Mode ON" in FIG. 6), the CPU 11 starts up a process shown in FIG. 8. Then, at step S7 of FIG. 8, the CPU 11 activates the edit mode, for example, by setting an edit mode flag to "ON" to thereby set the edit mode to the ON state.

Let it be assumed here that the fader operators 31 of channels "ch2" and "ch4" are then operated by "+c" and "+d", respectively (see "Second Fader Operation" in FIG. 6). In response to such operations of the fader operators, the CPU 11 starts up the processing shown in FIG. 1. Because, at that time, the overlay mode is ON (YES determination at step S1) and the edit mode is ON (YES determination at step S2), the CPU 11 changes the auxiliary value "b" of channel "ch2" by a value corresponding to the operated amount "+c" and changes the auxiliary value "b" of channel "ch4" by a value corresponding to the operated amount "+d" so that the auxiliary values of channel "ch2" and channel "ch4" become "b+c" and "b+d", respectively, at step S3 of FIG. 1. Consequently, the CPU 11 changes the current values of the tone volume level of channels "ch2" and "ch4" to "a+b+c" and "a+b+d", respectively, at step S3. Namely, when the edit mode is ON not only the current value of the tone volume level of the given channel stored in the memory 12 is changed but also the auxiliary value corresponding to the current value is changed, in response to an operation of the fader operator 31 of a given channel. In this case, the human operator can readily change the auxiliary values of channels "ch2" and "ch4" to values fitting present conditions by merely performing, by use of the corresponding fader operators 31, operations for adjusting the current values of the tone volume level of channels "ch2" and "ch4" in accordance with the present conditions. The knob positions of the fader operators 31 of channels "ch2" and "ch4" are moved to positions indicative of the current values "a+b+c" and "a+b+d", respectively, in response to the human operator's operations.

Further, once the human operator depresses the overlay mode switch 35 during the edit mode, deactivation or turning-off of the edit mode is instructed. In response to such an edit mode turning-off instruction, the CPU 11 starts up a process shown in FIG. 9. The CPU 11 ends or deactivates the edit mode, for example, by setting the edit mode flag to "OFF" to thereby reset the edit mode to the OFF state, at step S8.

Figure 10:
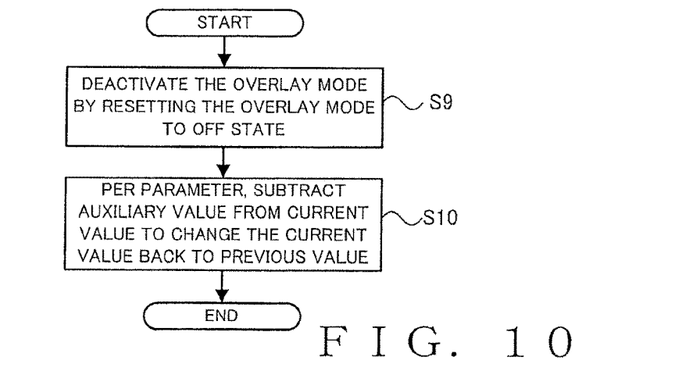
FIG. 10 is a flow chart showing an example operational sequence of a process responsive to an overlay mode deactivating operation.

Further, once the human operator depresses the overlay mode switch 35 when the overlay mode is ON and the edit mode is OFF, turning-off of the overlay mode is instructed. In response to such an overlay mode turning-off instruction, the CPU 11 starts up a process shown in FIG. 10. The CPU 11 deactivates the overlay mode, for example, by resetting the overlay mode flag to "OFF" to thereby reset the overlay mode to the OFF state, at step S9. At step S10, the CPU 11 returns the current values of the individual channels ("ch1", "ch2", "ch3", "ch4", . . . ) back to the previous values not having the auxiliary values added thereto (i.e., values unadjusted with the auxiliary values. More specifically, the CPU 11 subtracts the auxiliary value "b" from the current value "a+b+c" of channel "ch1" to change the current value to "a+c", subtracts the auxiliary value "b+c" from the current value "a+b+c" of channel "ch2" to change the current value to "a", subtracts the auxiliary value "b" from the current value "a+b+d" of channel "ch3" to change the current value to "a+d", subtracts the auxiliary value "b+d" from the current value "a+b+d" of channel "ch4" to change the current value to "a", and so on. At that time, the CPU 11 moves, in accordance with the change of the current value of each of the channels, the knob portion of the fader operator 31 to the position indicative of the changed current value.

Note that, once the fader operator 31 of any one of the channels is operated when the overlay mode is OFF, a NO determination is made at step S1 in FIG. 1, so that the CPU 11 changes only the current value of the tone volume level of that channel without changing the auxiliary value. The knob portion of the fader operator 31 is moved to the position indicative of the changed current value of the tone volume in response to the human operator's operation of the fader operator 31.

Figure 11:
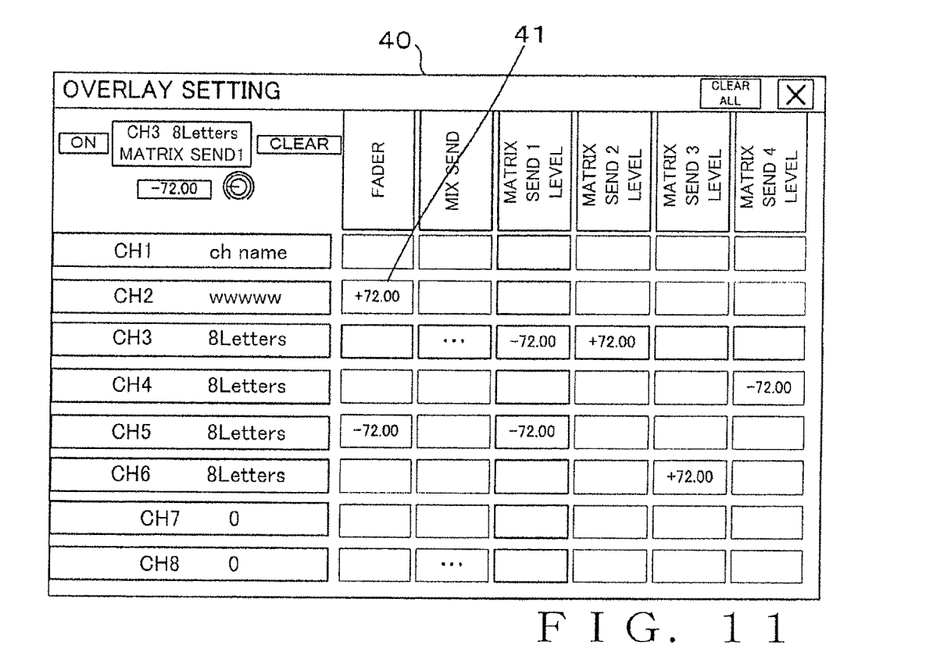
FIG. 11 is a diagram showing an example of a setting screen displayed on a display during the edit mode.

In an alternative, the CPU 11 may display, on the display 34 (display section 13), a setting screen illustratively shown in FIG. 11 in response to the activation of the edit mode at step S7 above. On the setting screen illustratively shown in FIG. 11, a plurality of channel names are displayed in a vertical direction while auxiliary values corresponding to a plurality of parameters are displayed in a horizontal direction (i.e., in a horizontal row) per channel. For example, if the auxiliary value of the tone volume level "FADER" of channel name "CH2" is changed, a value "72.00" indicated at a cell 41 is changed.

With the mixer 10 constructed in the above-described manner, not only the current value of the tone volume level stored in the memory 12 but also the auxiliary value corresponding to the current value can be changed by the human operator merely operating the fader operator 31 of any one of the channel strips 30 when the edit mode is ON. When the edit mode is OFF, on the other hand, only the current value is changed in response to the operation, by the human operator, of the fader operator 31 without the auxiliary value being changed. Although the object of control by the fader operator 31 is switched to the auxiliary value or the current value of the tone volume level in response to turning on or off of the edit mode, the position of the knob portion of the channel strip 30 always indicates the current value of the tone volume level irrespective of whether the overlay mode is ON or OFF or whether the edit mode is ON or OFF. Thus, the human operator can determine an appropriate auxiliary value fitting the present conditions with an operating feel as if he or she were changing the current value of the tone volume level. Further, there is no need to use different manual operators (manual operating members) for changing the current value and changing the auxiliary value. In addition, with the above-described embodiment, it is possible to readily start or activate the edit mode by the human operator just holding down the overlay mode switch 35 provided on the operation panel. Thus, by the human operator merely performing a simple operation of switching between the ON and OFF states of the edit mode, the auxiliary value stored in the memory 12 can be changed, with utmost ease and without requiring much time and labor, by use of a manual operator (e.g., fader operator 31) that is provided for changing the current value of a parameter.

Whereas the present invention has been described above in relation to the preferred embodiment, the present invention is not limited to the above-described preferred embodiment and may be modified variously within the technical scope shown and described in the accompanying drawings, the specification and the claims. For example, the operations intended for activating and deactivating the overlay mode and the edit mode are not necessarily limited to the operations of depressing and holding down the overlay mode switch 35 as described above in relation to the preferred embodiment. Further, the parameters to be operated by the human operator via the parameter setting apparatus of the present invention may be any other types of parameters than the channel-specific tone volume level, such as bus send level, input gain and various effect parameters, as long as they are parameters to which temporary assistance by auxiliary values are applicable. Further, the instruction for changing the current value of a parameter may be given in any desired way other than being given by use of the fader operator 31 as described above in relation to the preferred embodiment, as long as a change of the current value of the parameter can be instructed. For example, the instruction for changing the current value may be given by the human operator operating another manual operator than the fader operator 31, such as a knob-type operator 33, provided on the operation panel of the mixer 10, or may be received from outside the mixer 10 in a remote-controlled fashion.

Another embodiment of the present invention may be constructed as follows. Namely, a switch 32 in each of the channel strips 30 is in the form of an illuminatable switch. When the auxiliary value of a given parameter of a given channel has been changed, the CPU 11 illuminates the switch 32 of the given channel so as to visually notify that the auxiliary value has been changed.

Still another embodiment of the present invention may be constructed as follows. When the switch 32 of a given channel strip 30 has been depressed during the edit mode after the auxiliary value corresponding to the channel was changed at step S3 above, the CPU 11 cancels the change of the auxiliary value and returns the auxiliary value stored in the memory 12 back to the previous auxiliary value before the change. If the switch 32 was illuminated in response to the above-mentioned change of the auxiliary value, the CPU 11 turns off or deilluminates the switch 32 in response to the cancellation of the change.

Figure 12:
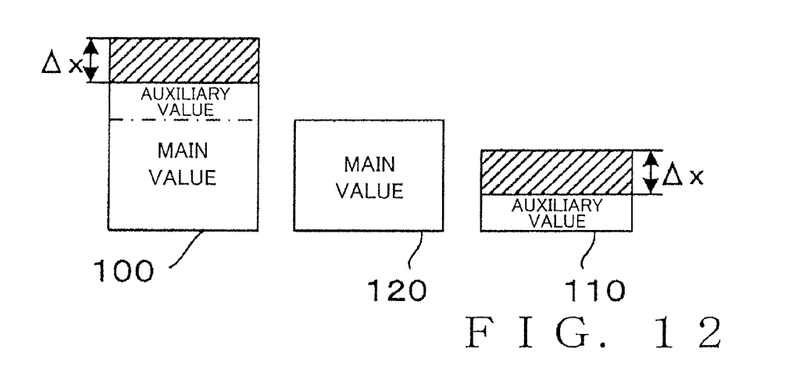
FIG. 12 is a diagram explanatory of a data storage format of current and auxiliary values in another embodiment of the present invention.

Further, whereas the preferred embodiment has been described above in relation to the data storage format where the current value 100 and the auxiliary value 110 of a parameter are stored in the storage section (the working area of the memory 12) as conceptually shown in FIG. 2, the data storage format may be any other desired format than the aforementioned. FIG. 12 conceptually shows another example of the data storage format in which the current value 100, the auxiliary value 110 and a main value 120 indicative of a value before the auxiliary value 110 is added to the current value 100 are stored independently of one another. In this case, when the overlay mode is OFF, the main value 120 is set directly as the current value 100, but when the overlay mode is ON, a sum obtained by adding the auxiliary value 110 to the main value 120 is set as a new current value 100, as shown in FIG. 12. Further, once an instruction for changing the current value of the parameter by $\Delta x$ is given, for example, by an operation of the fader operator 31, not only the current value but also the auxiliary value 110 is changed by $\Delta x$ in response to the current value change instruction, when the edit mode is ON; in this case, the main value 120 is not changed. When the overlay mode is OFF, or when the overlay mode is ON and the edit mode is OFF, the main value 120 and the current value 100 are each changed by Δx in response to the current value change instruction, without the auxiliary value 120 being changed.

Furthermore, the mixer 10 may be implemented by software that performs mixing processing on audio signals of a plurality of channels in a computer apparatus, such as a personal computer or a slate device, in which case the operation panel (channel strips 30 and the overlay mode switch 35) comprises an operation panel screen displayed on a display of the computer apparatus.

Furthermore, the parameter setting apparatus of the present invention is not limited to application to mixers as in the above-described embodiment and may be applied to a case where an auxiliary value is added to a current value of a parameter defining a tone color of an electronic musical instrument, such as a synthesizer, and other cases.

Moreover, the present invention may be constructed and implemented not only as the invention of the parameter setting apparatus, but also as a method invention which is designed to change, in response to a change instruction, current and auxiliary values of a parameter defining behavior of a processing section (like the signal processing (or MIX) section 15) and stored in the storage section and which comprises: a step of switching between ON and OFF states of the edit mode; and a change control step of, when the edit mode is ON, not only changing the current value in response to a current value change instruction but also reflecting the current value change instruction in the auxiliary value as well. Furthermore, the present invention may be constructed and implemented as a program invention which is designed to cause a computer to perform a process for changing, in response to a change instruction, current and auxiliary values of a parameter defining behavior of the processing section and stored in the storage section, and which causes the computer to perform a step of switching between ON and OFF states of the edit mode; and a change control step of, when the edit mode is ON, not only changing the current value in response to a current value change instruction but also reflecting the current value change instruction in the auxiliary value as well.

This application is based on, and claims priority to, Japanese patent application No. 2014-231919 filed on 14 Nov. 2014. The disclosure of the priority application, in its entirety, including the drawings, claims, and the specification thereof, are incorporated herein by reference.

What is claimed is:

1. A parameter setting apparatus comprising:
   a memory configured to store therein a current value of a signal processing parameter and an auxiliary value which is added to or subtracted from the current value in order to temporarily adjust the current value into an offset current value;
   a switch; and
   a processor,
   wherein the switch and the processor are configured to switch between ON and OFF states of an edit mode that define whether or not to change the auxiliary value, and
   wherein the processor is configured to, when the edit mode is ON and in response to an operation of a manual operator for changing the offset current value, change the offset current value and change the auxiliary value so as to reflect the operation of the manual operator.

2. The parameter setting apparatus as claimed in claim 1, wherein said processor is configured to, when the edit mode is OFF, change only the offset current value in response to the operation of the manual operator.

3. The parameter setting apparatus as claimed in claim 2, wherein said switch and said processor are further configured to switch between ON and OFF states of an overlay mode that define whether or not to use the auxiliary value, and wherein the edit mode is made valid only when the overlay mode is ON.

4. The parameter setting apparatus as claimed in claim 3, wherein each of switching between the ON and OFF states of the edit mode and switching between the ON and OFF states of the overlay mode is effected in response to an operation of said switch.

5. The parameter setting apparatus as claimed in claim 4, wherein the manual operator and the switch are embodied in a screen displayed on a display.

6. The parameter setting apparatus as claimed in claim 3, wherein said processor is configured to, when the overlay mode is switched from the OFF state to the ON state, change the current value, stored in said memory, into the offset current value.

7. The parameter setting apparatus as claimed in claim 6, wherein said processor is configured to, when the overlay mode is switched from the ON state to the OFF state, change the offset current value into the current value unadjusted with the auxiliary value.

8. The parameter setting apparatus as claimed in claim 6, wherein the signal processing parameter is a parameter for adjusting a tone volume level of a channel.

9. A computer-implemented method for setting a parameter by use of a memory which stores therein a current value of a signal processing parameter and an auxiliary value which is added to or subtracted from the current value in order to temporarily adjust the current value into an offset current value, and a manual operator, said method comprising;
   a step of switching between ON and OFF states of an edit mode that define whether or not to change the auxiliary value; and
   a step of, when the edit mode is ON and in response an operation of the manual operator for changing the offset current value, changing the offset current value and changing the auxiliary value so as to reflect the operation of the manual operator.

10. A non-transitory computer-readable storage medium containing a group of instructions executable by a processor for performing a method for setting a parameter by use of a memory which stores therein a current value of a signal processing parameter and an auxiliary value which is added to or subtracted from the current value in order to temporarily adjust the current value into an offset current value, the current value stored in the memory having been adjusted by the auxiliary value stored in the memory, and a manual operator, said method comprising;
   a step of switching between ON and OFF states of an edit mode that define whether or not to change the auxiliary value; and
   a step of, when the edit mode is ON and in response to an operation of the manual operator for changing the offset current value, changing the offset current value and changing the auxiliary value so as to reflect the operation of the manual operator.

* * * * *